United States Patent
DeWitt et al.

(10) Patent No.: US 8,358,420 B1
(45) Date of Patent: Jan. 22, 2013

(54) SPECTROMETER FOR IDENTIFYING ANALYTE MATERIALS

(75) Inventors: Kristin Marie DeWitt, Vienna, VA (US); Merrick Joseph DeWitt, Vienna, VA (US)

(73) Assignee: System Planning Corporation, Arlington, VA (US)

( * ) Notice: Subject to any disclaimer, the term of this patent is extended or adjusted under 35 U.S.C. 154(b) by 449 days.

(21) Appl. No.: 12/660,403

(22) Filed: Feb. 26, 2010

(51) Int. Cl.
*G01B 9/02* (2006.01)

(52) U.S. Cl. .................................... 356/452; 356/450
(58) Field of Classification Search ............ 356/432–33, 356/450–456
See application file for complete search history.

(56) References Cited

U.S. PATENT DOCUMENTS

| | | | |
|---|---|---|---|
| 5,530,544 A * | 6/1996 | Trebino et al. ............ | 356/450 |
| 5,748,309 A | 5/1998 | Van der Weide et al. | |
| 6,822,742 B1 * | 11/2004 | Kalayeh et al. ............ | 356/437 |
| 7,075,653 B1 * | 7/2006 | Rutherford ................ | 356/437 |
| 2006/0119855 A1 * | 6/2006 | Li ............................ | 356/450 |

* cited by examiner

*Primary Examiner* — Gregory J Toatley
*Assistant Examiner* — Dominic J Bologna

(57) ABSTRACT

A spectrometer for identifying an analyte material. One embodiment of the spectrometer includes a single ultrashort pulsed laser (USPL) source, a fiber interferometer, a frequency converter and a transceiver. The USPL source is configured to generate a laser beam. The interferometer is operatively coupled to the USPL source, and is configured to split the laser beam into a first laser beam and a second laser beam, providing a variable difference in lengths between the paths of the first laser beam and the second laser beam. The spectrometer then electronically scans the variable-path second laser beam over the first laser beam to generate interferogram patterns. The frequency converter is configured to receive the interferogram patterns from the interferometer, and perform a frequency conversion of the interferogram patterns to form an output beam. The transceiver is configured to transmit the output beam and to receive radiation from the analyte material. The radiation is thereafter used to identify the analyte material.

20 Claims, 6 Drawing Sheets

SPECTROMETER FOR IDENTIFYING ANALYTE MATERIALS

CROSS REFERENCE TO RELATED APPLICATIONS

None.

BACKGROUND

1. Technical Field

The present invention relates to spectrometers for identifying analyte materials and more particularly, to a Fourier transform based spectrometer.

2. Description of Related Art

Spectrometers are generally utilized in detecting, characterizing, quantifying, or imaging analyte materials. Such analyte materials may be any chemical substance or object detected, characterized, quantified, or imaged by the spectrometer. For example, the analyte material may include airborne, waterborne and/or surface-adhered chemical species, concealed or buried objects, or facilities suspected to contain chemical or biological species of interest.

One type of conventional spectrometer technology known in the art is the Fourier Transform Infrared (FTIR) Spectrometer. FIG. 1 is a schematic diagram of an FTIR spectrometer known in the art. This type of FTIR spectrometer 100 generally includes an incoherent light source 10, a Michelson interferometer arrangement 30, and an infrared detector 60. The incoherent light source 10 is configured to generate a light beam 12 which is directed to the Michelson interferometer arrangement 30.

In the prior art, the Michelson interferometer arrangement 30 is operatively coupled to the incoherent light source 12 and includes a beam splitter 32, a fixed mirror 34, and a moving mirror 36. The beam splitter 32 is configured to receive the light beam 12 generated by the incoherent light source 10 and to split the light beam 12 into a first light beam 14 and a second light beam 16.

Conventionally, the fixed mirror 34 and the moving mirror 36 are optically coupled to the beam splitter 32. The fixed mirror 34 receives the first light beam 14 and reflects the first light beam 14 parallel to its incident path. Similarly, the moving mirror 36 receives the second light beam 16 and reflects the second light beam 16 along its incident path.

Generally, the moving mirror is capable of being moved between a first position A and a second position B with the movement being restricted to a direction parallel to that of the light beam. Such displacement of the moving mirror generates a variable difference in length between the paths of the reflected first light beam and the reflected second light beam.

The path length difference produces an interference pattern 38 (hereinafter referred to as 'interferogram 38') at the beam splitter. More specifically, the moving mirror 36 is translated between position A and position B in precise increments, with a data point being recorded after each translation step. The difference in the varying path lengths of the first light beam and the second light beam results in alternating constructive and destructive interference between these beams, which is mathematically describable as a convolution of the first light beam and the second light beam. Performing a Fourier transform of the interferogram 38 obtained in the time domain produces a frequency domain spectrum of the original light beam.

Thereafter, the beam splitter passes the recombined light beam with superimposed interferogram 18 to an analyte material 50 that is to be analyzed. A detector 60 then detects the radiation pattern and a data processing system 70 generates a spectrogram 80 corresponding to characteristics of the analyte material. The spectrogram may then be compared with other spectrograms corresponding to a plurality of known materials to identify the analyte material.

Conventional FTIR spectrometers, such as the spectrometer described above, suffer from a number of limitations. A major limitation is that such conventional FTIR spectrometers are sensitive to vibrations and thermal effects. More specifically, the moving mirror of the conventional FTIR spectrometers must be positioned with exact precision in order to generate a desired interferogram. Any inaccuracy in the positioning of the moving mirror will degrade or destroy the generated spectrogram.

A further limitation of conventional FTIR spectrometers is that they are unsuitable for long-range or diffraction-limited imaging. More specifically, incoherent light sources used in the conventional FTIR spectrometers are difficult to collimate and propagate over long distances, and cannot be focused to a diffraction-limited spot size.

Additionally, conventional FTIR spectrometers exhibit poor time resolution. This may be attributed to physical limitations on how fast the moving mirror can be accurately translated during generation of the spectrogram. Moreover, under even low-light conditions the spectrograms generated by conventional FTIR spectrometers can be degraded by ambient background radiation, and in bright-light conditions (such as daylight) the ambient background radiation can swamp the signal radiation entirely (signal-to-noise ratio less than 1). Accordingly, there has been a need to develop FTIR spectrometers that overcome drawbacks inherent to conventional FTIR spectrometers.

One example of a FTIR spectrometer developed to overcome the above described drawbacks is provided in U.S. Pat. No. 5,748,309 to Van der Weide et al. Van der Weide teaches the use of use two solid state ultra-short pulsed lasers (USPLs) having variable pulse repetition rates in place of the two mirrors of a Michelson interferometer arrangement. The FTIR spectrometer taught by Van der Weide provides a well behaved beam for imaging but it requires two fragile, expensive, and inefficient solid state USPLs. Further, this type of FTIR spectrometer requires complicated locking electronics to precisely synchronize the repetition rates of the two USPLs.

SUMMARY OF THE DISCLOSURE

In view of the foregoing disadvantages, the present invention provides a spectrometer for identifying analyte material which overcomes the limitations inherent in the prior art.

One embodiment described in the present disclosure relates to a spectrometer which includes a single USPL source, a fiber interferometer, a frequency converter, and transmitter/receiver optics.

The USPL source is configured to generate a laser beam. The interferometer is operatively coupled to the USPL source, and is configured to split the laser beam into a first laser beam and a second laser beam, providing a variable difference in lengths between the paths of the first laser beam and second laser beam. The spectrometer then electronically scans the variable-path second laser beam over the first laser beam to generate interferogram patterns.

The frequency converter is operatively coupled to the interferometer and configured to receive the interferogram patterns. The frequency converter is designed to then perform a frequency conversion of the interferogram patterns to form an output beam having one of a plurality of desired wavelength bands.

The transmitter optics are operatively coupled to the frequency converter and configured to transmit the output beam for irradiating the analyte material. Thereafter, the receiver optics are configured to receive radiation that has passed through or been reflected from the analyte material, which is then detected and analyzed.

A second embodiment described in the present disclosure relates to a spectrometer for identifying an analyte material wherein the spectrometer includes a USPL laser source, an interferometer, a frequency converter, transmitter/receiver optics, and a data processing system. In this second embodiment, the data processing system is configured to transform the radiation received from the analyte material into a spectrum which is then analyzed to detect, characterize, quantify, and/or image the analyte material.

In yet a third embodiment, a method is provided for identifying an analyte material. This method includes generation of a laser beam with a USPL and the generation of interferogram patterns from the said laser beam via a fiber interferometer.

This method further includes performance of a frequency conversion of the interferogram patterns to form an output beam having one or more of a plurality of desired wavelength bands. Furthermore, the method includes transmission of the output beam for irradiating the analyte material, and reception of radiation from the analyte material. After receiving the radiation from the analyte material, the method further includes the steps of analyzing the radiation and detecting, characterizing, quantifying, and/or imaging the analyte material.

BRIEF DESCRIPTION OF THE DRAWINGS

The features and advantages of the present invention will be more clearly understood from the following description taken in conjunction with the accompanying drawings in which.

Like reference numerals refer to like parts throughout the description of several views of the drawings.

DETAILED DESCRIPTION OF THE DISCLOSURE

The present invention will be described in detail with reference to the accompanying drawings. Throughout the present description, it should be understood that the term 'spectrometer' as mentioned herein refers to an instrument that analyzes radiation patterns of analyte materials. Further, herein the term 'identifying' the analyte material refers to detecting, characterizing, quantifying, or imaging the analyte material. Further, it should be understood that the 'analyte material' as mentioned herein refers to any chemical substance, or object that may be required to be detected, imaged, identified, and/or characterized by the spectrometer. For example, the analyte material may include hazardous airborne, waterborne, and/or surface-adhered biological and chemical species (including explosives residues), concealed or buried objects, or facilities suspected to contain chemical or biological species of interest.

Figure 1:
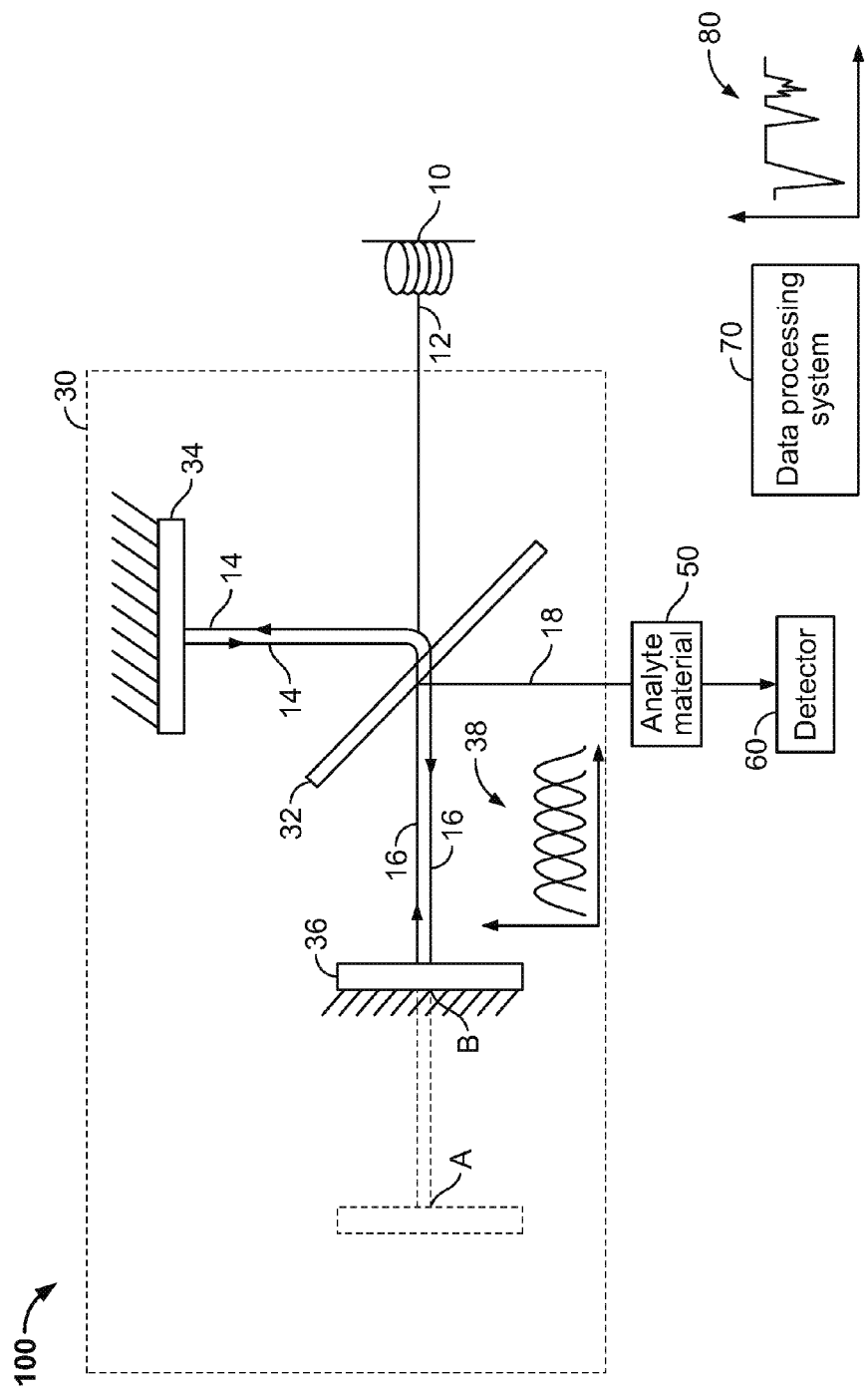
FIG. 1 is a schematic diagram of a conventional FTIR spectrometer known in the art.
Figure 2:
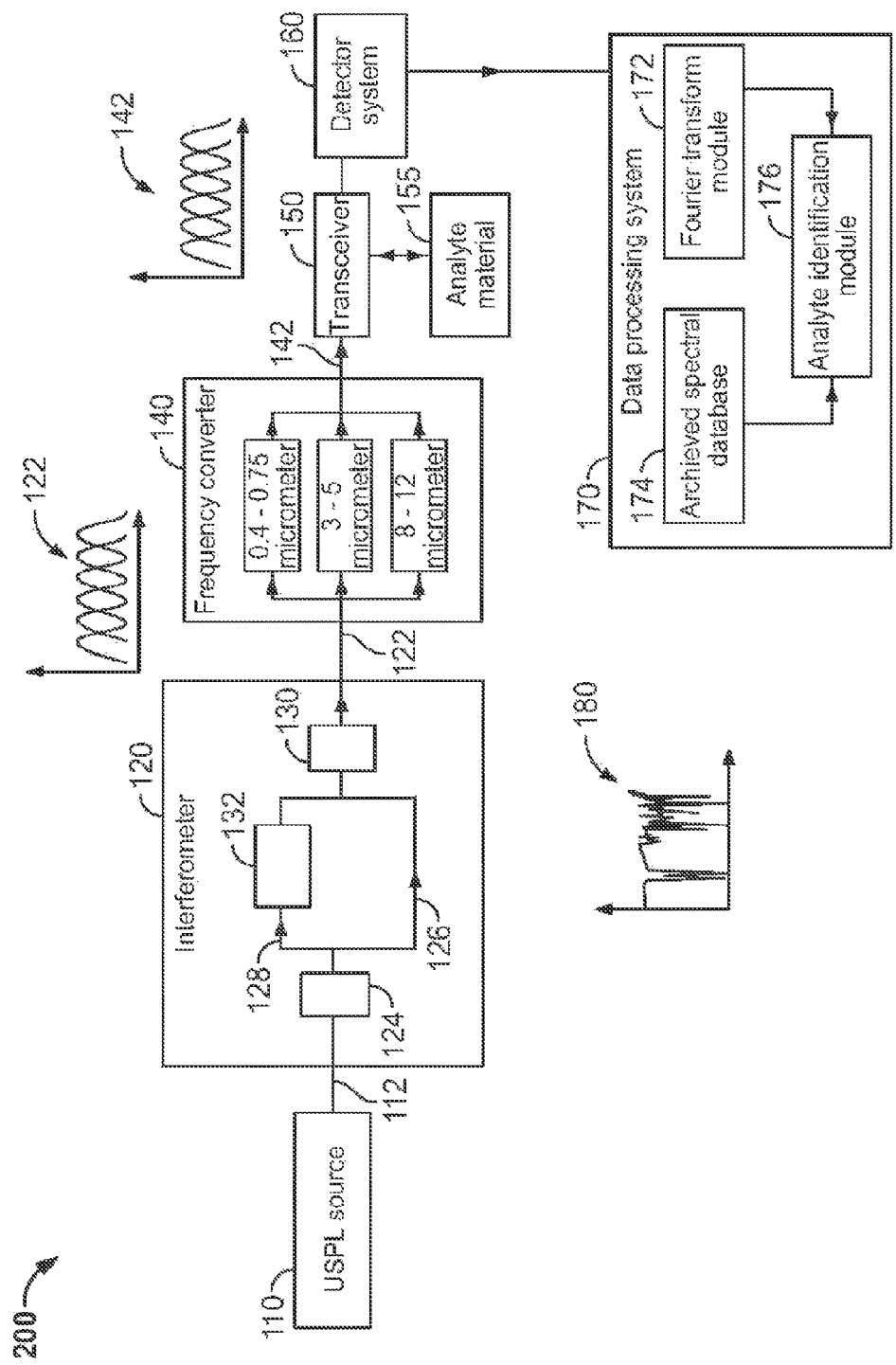
FIG. 2 is a block diagram of a spectrometer according to one exemplary embodiment of the present invention.

FIG. 2 is a block diagram of a spectrometer 200 according to an exemplary embodiment of the present disclosure.

As shown in FIG. 2, the spectrometer 200 includes a USPL laser source 110 (hereinafter referred to as 'laser source 110') configured to generate a laser beam 112. Although the invention may operate at any fundamental wavelength, in one form, the laser beam may have a wavelength of approximately 1.5 micrometers. The laser source 110 preferably includes a fiber-based oscillator and amplifier capable of generating the laser beam 112. The laser source could also be a solid-state USPL with appropriate additional optics to couple the laser output into fiber. In one form, the laser beam 112 may have a pulse duration of approximately 20 fs to 500 ps, and a pulse repetition rate of approximately 1 kHz to 500 MHz. The laser source 110 as mentioned herein is preferably a fiber-based laser source and may include a plurality of optical fibers (doped with rare-earth elements) forming an optical core for generating the laser beam 112. When used in any space-based applications, since cosmic rays tend to degrade optical fibers, the amount of fiber in any laser source would be preferably limited and appropriately shielded.

Further, the spectrometer 200 includes an interferometer 120 operatively coupled to the laser source 110. The interferometer 120 is configured to receive the laser beam 112 generated by the laser source 110, and to generate interferogram patterns 122 from the laser beam 112.

According to a further aspect of the present invention, the interferometer 120 includes a beam splitter 124, a fixed transmission leg 126, a variable transmission leg 128, and a combiner 130. This aspect of the present invention is described in detail below with reference to FIG. 3. In accordance with the full scope of the present invention, it is to be noted that the variable path does not have to be delayed with respect to the fixed path—i.e. it may be shorter OR longer. For a double-sided interferogram it is necessary to vary the variable path an equal distance on either side (shorter and longer) of the point where the path lengths are identical ($T_o$ point). For a single-sided interferogram it is only necessary to vary the variable path length on one side of $T_0$ (either shorter OR longer).

Figure 3:
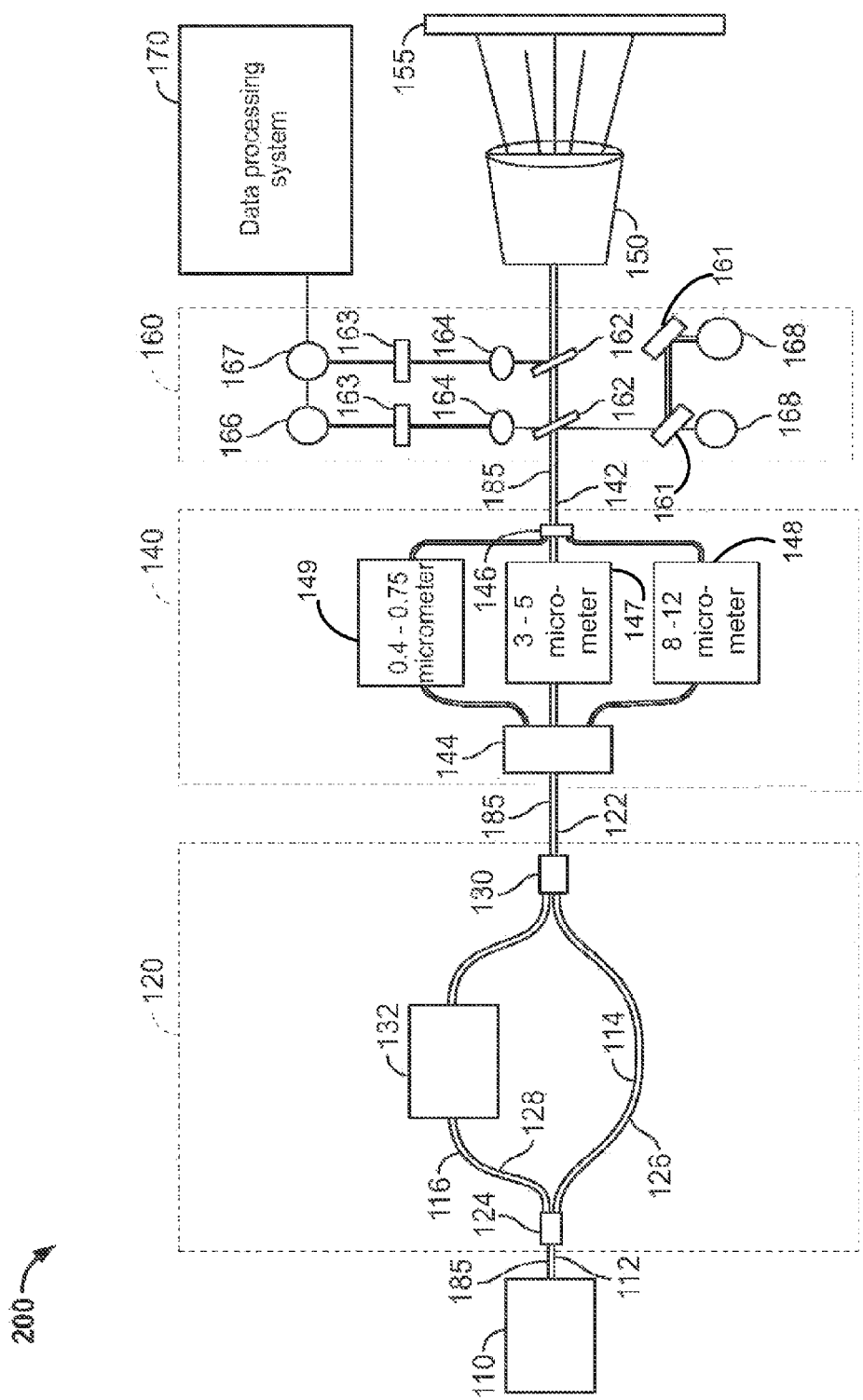
FIG. 3 is a schematic diagram of the spectrometer of FIG. 2.

With reference to FIG. 3, the beam splitter 124 is configured to receive the laser beam 112 generated by the laser source 110. Further, the beam splitter 124 is configured to split the laser beam 112 into a first laser beam 114 and a second laser beam 116. According to a preferred embodiment, beam splitter 124 preferably is a fused fiber splitter (evanescent wave coupling). Alternatively, other types of beam splitters may also be used.

In accordance with a further aspect of the present invention, the fixed transmission leg 126 is operatively coupled to the beam splitter 124. Further, the fixed transmission leg 126 is configured to propagate the first ultrafast laser beam 114 therethrough. Without departing from the scope of the present invention, the fixed transmission leg 126 may include a fusion spliced or connectorized fiber-based cable for transmitting the first ultrafast laser beam 114 therethrough. Alternatively, the fixed transmission leg 126 may include other free-space transmission lines as known in the art. Further, although the length of the fixed transmission leg is considered to be a constant with respect to the length of the variable transmission leg during the course of acquiring a single interferogram, this condition does not preclude the fixed transmission leg from containing a fiber stretcher or other means of path length adjustment to be used on a longer timescale. For example, the length of the fixed leg may need to be changed slowly in time to compensate for thermal drift in the fiber length, or one may wish to shift from single to double-sided interferograms, requiring the relative position of $T_0$ between the two legs to be reset.

Further, in accordance with a preferred embodiment, the variable transmission leg 128 is also operatively coupled to the beam splitter 124. Further, the delay transmission leg 128 is configured to propagate a variable-path form of the second ultrafast laser beam 116 (also referred to as a variable-path second ultrafast laser beam 116) therethrough. The variable transmission leg 128 may include a fiber-based cable having a fiber stretcher 132 operatively coupled to a portion of the fiber-based cable. The fiber stretcher 132 is capable of varying the temporal position of the second ultrafast laser beam 116 with respect to the first ultrafast laser beam 114, which is further propagated through the variable transmission leg 128.

According to a further aspect of the present invention, the fiber stretcher 132 may include a mandrel having two hemispherical components adapted to be forced apart by a piezoelectric actuator for introducing the pulse delay in the second ultrafast laser beam. Alternatively, other designs for fiber stretchers may also be used. This aspect of the present invention is depicted in FIG. 4.

Figure 4:
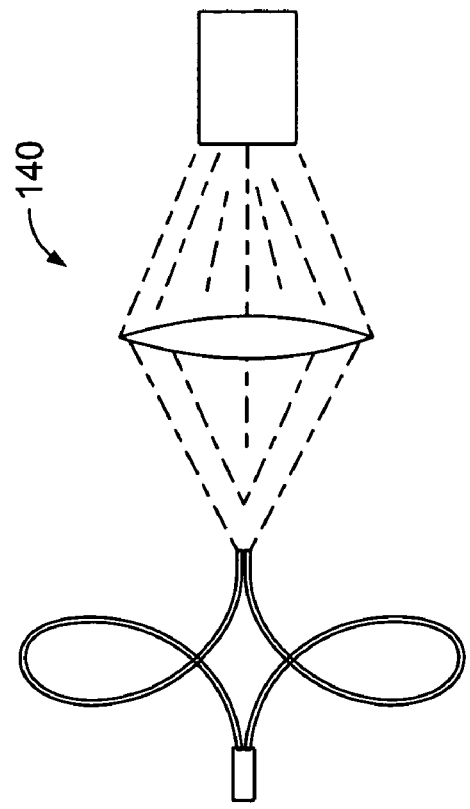
FIG. 4 is a perspective view of an optical stretcher and a frequency converter of the spectrometer of FIG. 2.
Figure 4:
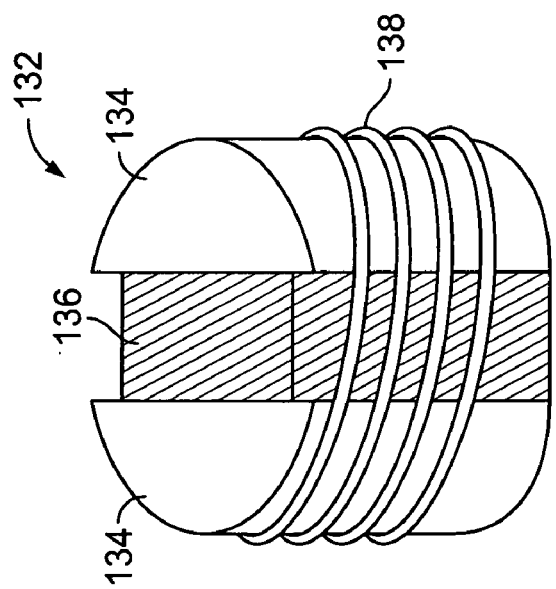

With reference now to FIG. 4, the fiber stretcher 132 preferably includes a mandrel having two hemispherical components 134 adapted to be forced apart by a piezoelectric actuator 136. The mandrel 134 is wrapped around by a portion of the delay transmission leg 138. According to a preferred embodiment, the fiber stretcher 132 may introduce a stretch of approximately 4.5 millimeters per 20 meter portion of the delay transmission leg 128. However, it should be clearly understood that such a configuration of the optical stretcher 132 is an exemplary representation and that there are a number of alternative designs of fiber stretchers which could be used with the present invention. Among these alternative designs, the hemispherical mandrel is one of the most efficient for obtaining a large amount of stretch (and therefore a large path length variance) in a compact form factor. In the case of the hemispherical mandrel, the most efficient designs use multiple stacked windings or nested cylindrical piezos to obtain maximum stretch.

By combining the variable transmission leg 128 having the fiber stretcher 132 and the fixed transmission leg 126, an electronic scanning of the first laser beam 114 by the variable-path second laser beam 116 may be achieved. Such electronic scanning may be used to produce the interferogram patterns 122. In one embodiment, such scanning is preferably performed in multiple steps wherein each step produces a single point on the interferogram patterns 122. In another embodiment the scanning is performed at a fixed rate with data recorded in a continuous (analog) or discrete (digital) fashion during the scan.

Now referring again to FIGS. 2 and 3, a combiner 130 is provided. According to a preferred embodiment, the combiner 130 is preferably an all-fiber fused combiner (evanescent wave coupling) which is operatively coupled to the fixed transmission leg 126 and the variable transmission leg 128. The combiner 130 is further configured to combine the first laser beam 114 and the variable-path second laser beam 116 for generating the interferogram patterns 122. Alternately, the fixed and variable-path beams could be created by using a fiber source and a free space combiner. For most applications this free-space implementation would be non-ideal, due to the added fragility and size of free-space optics. One application where free-space optics may be the preferred configuration would be on space-based platforms.

As further shown, the spectrometer 200 further includes a frequency converter 140 operatively coupled to the interferometer 120, and more specifically to the combiner 130 of the interferometer 120. Potential configurations between the interferometer and the frequency converter include: 1) the interferometer directly coupled to a single frequency converter; 2) the interferometer coupled through a multi-way switch to several frequency converters, allowing one of several wavelength bands to be accessed at a time; 3) the interferometer simultaneously coupled through a multi-way beam divider (fiber or free-space) to several frequency converters (this option would require a higher level of fundamental laser power, but would result in the fastest possible acquisition of a full hyperspectral spectrogram).

As shown in FIGS. 2 and 3, the frequency converter 140 is configured to first receive the interferogram patterns 122 generated by the interferometer 120 and to thereafter perform a frequency conversion of the interferogram patterns 122 to form an output beam 142 having one or more of a plurality of desired wavelength bands. More specifically, the interferogram patterns 122 may include a particular wavelength band from a plurality of desired wavelength bands. The plurality of desired wavelength bands may include, but are not limited to, wavelength bands in the ultraviolet, visible, infrared, or terahertz range. According to a preferred embodiment, potential wavelength bands to be accessed may include:

1) laser fundamental—if the analyte of interest can be interrogated with the laser fundamental, then no frequency conversion stage is needed;

2) ultraviolet (200-400 nm)—not practical for standoff detection due to atmospheric attenuation and low conversion efficiencies, but plausible for short distance applications;

3) visible (400-750 nm)—practical for standoff detection due to clear atmospheric transmission windows, though power levels will be physically limited by low conversion efficiencies and practically limited by eye safety requirements;

4) infrared (750 nm to 20+ micron)—only infrared windows from 1.4-2.2 micron, 3-5 micron, and 8-12 micron are practical for standoff detection due to atmospheric transmission, however, other wavelengths are potentially useful for short-distance applications; and 5) terahertz (0.5-5 THz, 60-600 micron)—substantial challenges for standoff applications due to low conversion efficiencies, atmospheric attenuation, and required advances in detector technology The frequency converter 140 may perform a frequency conversion of the interferogram patterns 122 such that the output beam 142 includes a particular wavelength band based on selected criteria. As detailed above, such criteria may include the nature of the analyte material to be determined, the type of spectroscopy required for the identification of the analyte material, distance, or other factors. For example, detecting an IED buried in the ground may require one particular wavelength band, while detecting a vehicle borne explosive may require a different wavelength band. In one embodiment, the frequency converter 140 may include a highly nonlinear fiber system for performing the frequency conversion of the interferogram patterns 122. This embodiment of the present disclosure is depicted in FIG. 4.

The frequency converter 140 may include a highly nonlinear fiber system producing a super-continuum followed by a sum/difference frequency generation in a nonlinear crystal 144 such as a periodically poled lithium niobate (PPLN) crystal. However, depending both on the fundamental laser wavelength and on the desired wavelength band, alternative forms of frequency converters may be desirable. Further, even with a given laser fundamental and wavelength band, the design of the frequency converter will depend on the application. According to a preferred embodiment, options include all-fiber versions using one or more types of photonic crystal fibers (aka highly nonlinear fiber (HNLF)), all free—space versions using one or more nonlinear crystals (including angle-tuned, temperature tuned, periodically poled and/or waveguide crystals), or hybrid versions using both nonlinear fiber and nonlinear crystals. By wavelength region, the general set of frequency conversion options may include any of the options discussed below:

1) Ultraviolet—May be accessible through a combination of optical parametric generation (OPG), second harmonic generation (SHG) and sum frequency generation (SFG) techniques with the use of either free space angle tuned or periodically poled crystals, or fiber coupled waveguide periodically poled crystals.

2) Visible—May be accessible through a combination of OPG, SHG, and SFG techniques with similar configurations as for ultraviolet. With a short-wavelength laser fundamental the visible may also be accessible through continuum generation in a photonic crystal fiber.

3) Infrared—in this band, infrared (NIR, 0.75-1.4 micron) 149 or short-wave infrared (SWIR, 1.4-3 micron) may be accessible either by continuum generation in a photonic crystal fiber or by OPG using a nonlinear crystal. Mid-wave infrared (MWIR 3-8 micron) 147 may be accessible either by OPG or continuum generation followed by difference frequency generation (DFG) in a free-space or waveguide crystal. Long-wave infrared (LWIR, 8-15 micron) 148 and/or far infrared (FAR, 15 micron plus) may be accessible either by OPG or continuum generation followed by DFG, or by direct optical rectification in a nonlinear crystal.

4) THz—May be accessible by direct optical rectification in a nonlinear crystal or irradiation of a semiconductor antenna source.

In addition, the spectrometer 200 may also include transmitter/receiver optics 150 operatively coupled to the frequency converter 140, and more particularly to an output 146 of the frequency converter 140 (although a mono-static transceiver is provided for purposes of illustration, potential applications may also use bi-static or multi-static transceivers as well). Further, the transmitter optics (150) are configured to transmit the output beam 142 for irradiating an analyte material 155. The receiver optics (150) are further configured to receive radiation transmitted through and/or backscattered from the analyte material 155. Herein, the radiation that is transmitted through or backscattered (interchangeably referred to as 'analysis radiation') from the analyte material 155 is a result of the interaction between the output beam 142 and the analyte material 155. This analysis radiation is incident on the receiver optics of the transceiver 150. The analysis radiation from the analyte material 155 may then be analyzed for identifying the analyte material 155.

According to a preferred embodiment of the present invention, potential propagation options may include: 1) aerosol transmission spectroscopy (where the transmitter and receiver(s) are positioned on opposite sides of an area to be sampled for potential analytes—for example chemical/biological monitoring in a train station with the transmitter on one side of the platform and the receiver on the other side); 2) single point specular surface reflection (which requires normal incidence for a monostatic transceiver, or the use of a bistatic transceiver); 3) single point diffuse surface reflection (using a—monostatic, bistatic, or multistatic transceiver); 4) single point diffuse aerosol reflection (using a monostatic, bistatic, or multistatic transceiver); 5) single point diffuse reflection in water or other liquids (using a monostatic, bistatic, or multistatic transceiver); 6) imaging either with a raster-scanned beam and single-element detector, or an array detector where a separate interferogram is recorded at each detector pixel (using a monostatic, bistatic, or multistatic transceiver).

As further shown in FIGS. 2 and 3, the spectrometer 200 may include a detector system 160 comprised of either array detectors, or single element detectors. The detector system 160 may be optically coupled to the receiver optics 150. In one embodiment, the detector system 160 may include a plurality of dichroic mirrors 162, filters 161 and 163, and focusing/shaping lenses or mirrors 164. The detector system 160 may further include a plurality of detectors to cover the various wavelength regions such as an Infrared. (IR) detector 166, and a visible light (VL) detector 167. For non-imaging analysis, these preferably would be single-point detectors, and the dichroic mirrors, filters, and lenses or mirrors would preferably be free space or fiber-coupled. For imaging with an array detector, the dichroic mirrors, filters, and lenses or mirrors are preferably free-space to preserve the image. Further, a reference detector 168 is required for each wavelength band to sample the waveform prior to interaction with the analyte, allowing background-corrected absorbance spectra to be obtained. The reference detector (s) monitor a small (few percent) portion of the beam "picked off" prior to transmission.

Further, the spectrometer 200 may also include a data processing system 170 operatively coupled to the detector system 160. The data processing system 170 may be configured to transform the analysis radiation received from the detector system 160 into a spectrogram 180, which is then analyzed to identify the analyte material 155.

According to a preferred embodiment, the data processing system 170 may include a Fourier transform module 172, an archived spectral database 174, and an analyte identification module 176. The Fourier transform module 172 is configured to Fourier transform the analysis radiation detected by the detector system 160 into the spectrogram 180. More specifically, the Fourier transform module 172 may include a Fourier transform algorithm (such as the Fast Fourier Transform or FFT) capable of Fourier transforming the analysis radiation from a time domain interferogram to the spectrogram 180 which is in the frequency domain.

The analyte identification module 176 may be operatively coupled to the Fourier transformation module 172, and the archived spectral database 174. The archived spectral database 174 may be configured to store a plurality of 'fingerprint patterns' (i.e. known spectral patterns/spectrograms) corresponding to a plurality of known materials. Further, the analyte identification module 176 may be configured to compare the spectrogram 180 with the fingerprint patterns stored in the archived spectral database 174. More specifically, the analyte identification module 176 may include a dynamic comparison algorithm for comparing the measured spectrogram 180 with the plurality of fingerprint patterns stored in the archived spectral database 174.

With regards to the dynamic comparison algorithm, this process is understood to comprise several steps and a variety of software and hardware functions. In the situation of having a single unknown compound present either in the air or on a surface, then a simple lookup table can be used. Each of the reference spectra (or "fingerprint patterns") in the spectral database may be stored as a series of normalized digitized histograms, with wavelength on the x-axis and signal intensity on the y-axis. In this process, the spectrogram of the analyte is converted to a similar normalized digitized histogram, and a pattern-matching algorithm is used to find the best "match" to the archived database.

In "real-world" applications, the spectra of multiple analytes are likely to be present simultaneously, and the signals of interest either mixed in with or overwhelmed by signals from non-target background "clutter." The first step in this case is to remove as much clutter signal as possible. Potential methods to detect low levels of target signal in the presence of a strong "background" substrate signal include: 1) varying the angle of incidence to preferentially enhance surface signals (works with diffuse reflectance only); 2) comparison of spectra obtained with cross-polarized light to separate absorption by the ordered substrate from absorption by more amorphous contaminant adsorbates; and 3) differential spectroscopy that takes advantage of inherent adsorbate coverage inhomogeneities to elucidate trace contaminant signatures by comparing single point spectra from several adjacent physical positions on the object surface.

Once the clutter signal is removed or reduced, the resulting normalized digitized spectrogram can be compared with the archived spectral database, with the pattern matching algorithm allowed to "sum up" various combinations of target analytes in varying concentrations in order to obtain the best match (or matches) possible. If no definite compound ID can be obtained due to spectral complexity or low data quality, analysis of specific target wavelength bands can be used to derive a probability of a particular target analyte being present. Also, the algorithm may use data from specific "functional group" regions of the spectrogram along with molecular structure tables or calculations to identify the chemical class or potential structure of unknown compounds in order to predict potential hazards or toxicity. The system may also be capable of measuring and processing additional data such as absolute image dimensions, target distance, atmospheric parameters, etc. in order to allow quantitative determination of analyte concentrations. The system may also include reference standards and self-calibration functionality.

Referring now back to spectrometer 200, this may include connectorized fiber-based cables 185 for operative coupling of various components (or modules) of the spectrometer 200. More specifically, the fiber-based, cables 185 may be used for operatively coupling the laser source 110 with the interferometer 120, the frequency converter 140 with the interferometer 120, and the frequency converter 140 with the transceiver 150. Further, the fiber-based cables 185 may also be used for operatively coupling various sub-components of the spectrometer 200.

As may be understood from the above descriptions of FIGS. 2 and 3, the operation of the present invention allows for the processing of the generated laser beam 112 to detect, identify, characterize, and/or image a target analyte. In its detailed operation, the interferometer 120 will preferably split the laser beam 112 into the first laser beam 114 and the second laser beam 116. Thereafter, the first laser beam 114 may be propagated through the fixed transmission leg 126. At the same time, the second laser beam 116 will preferably be propagated through the variable transmission leg 128 and propagate a variable-path second laser beam 116. Thereafter, the first laser beam 114 and the variable-path second laser beam 116 may then be combined to generate the interferogram patterns 122.

The interferogram patterns 122 may thereafter be received by the frequency converter 140. The frequency converter 140 may then perform a frequency conversion of the interferogram patterns 122 to form the output beam 142 capable of irradiating the analyte material 155. Thereafter, the transmitter optics 150 will transmit the output beam 142 and receiver optics will receive any analysis radiation from the analyte material 152. The analysis radiation from the analyte material 155 may then be analyzed for identifying the analyte material 155.

For analyzing the analysis radiation, the detector system 160 may segregate the backscattered radiation based upon the wavelength to obtain appropriate spectra corresponding to the analyte material.

Thereafter, the Fourier transform module 172 preferably performs a Fourier transform of the data from each detector and corresponding reference detector. The background corrected spectrogram 180 may then be compared with a plurality of fingerprint patterns stored in the archived spectral database 174 via the analyte identification module 176. If during the comparison a match of the spectrogram 180 is identified, then the data processing system 170 may create a message or notice for a user.

Now with further reference to FIG. 5, a preferred method according to the present invention will be described.

Figure 5:
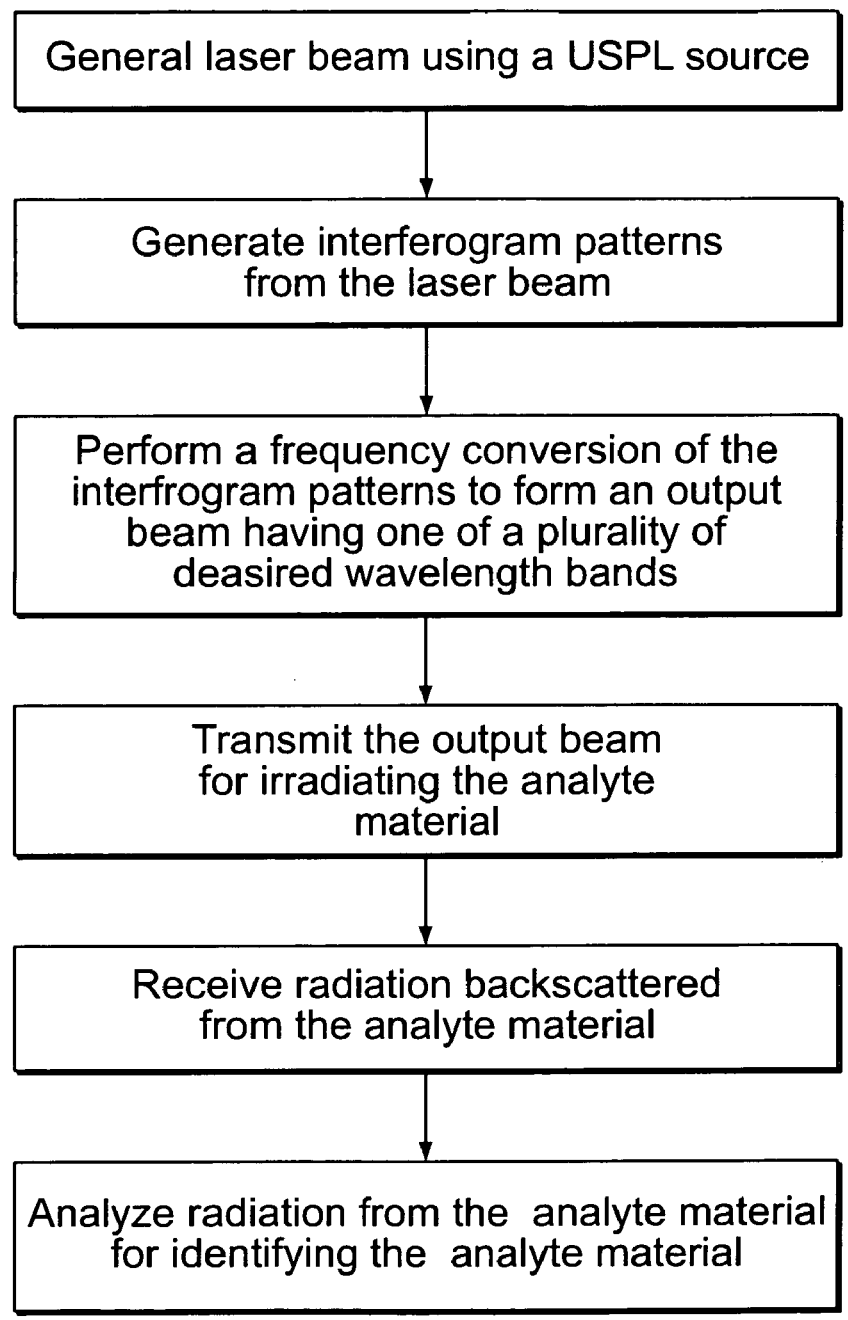
FIG. 5 is a block diagram of a method for identifying an analyte material according to one exemplary embodiment of the present invention.

FIG. 5 is a block diagram of a method 300 for identifying an analyte material according to an exemplary embodiment of the present invention. The method 300 includes generating a laser beam 210 using a USPL source. Thereafter, the method 300 includes generating interferogram patterns from the laser beam at 220. As detailed above, the interferogram patterns are preferably generated by splitting the laser beam into a pair of laser beams.

The method 300 further includes the step 230 of performing a frequency conversion of the interferogram patterns to form an output beam having light in one or more desired wavelength bands. If more than one wavelength band is used, light from each of the different bands may be transmitted sequentially or simultaneously. As detailed above, the frequency conversion may preferably be performed by a frequency converter 140.

The method 300 further includes the step 240 of transmitting the output beam for irradiating the analyte material. As detailed above, the irradiation of the analyte material leads to an interaction between the scanning beam and the analyte material, thereby generating analysis radiation.

As a next step, the method 300 includes receiving the analysis radiation at 250. This analysis radiation may then be analyzed at 260, for identifying the analyte material. According to a preferred embodiment, analyzing the analysis radiation preferably includes Fourier transforming the analysis radiation into a spectrogram which is then compared with a plurality of fingerprint patterns corresponding to a plurality of materials. This may also include clutter filter algorithms and dynamic pattern matching or structure analysis algorithms as discussed above.

Figure 6:
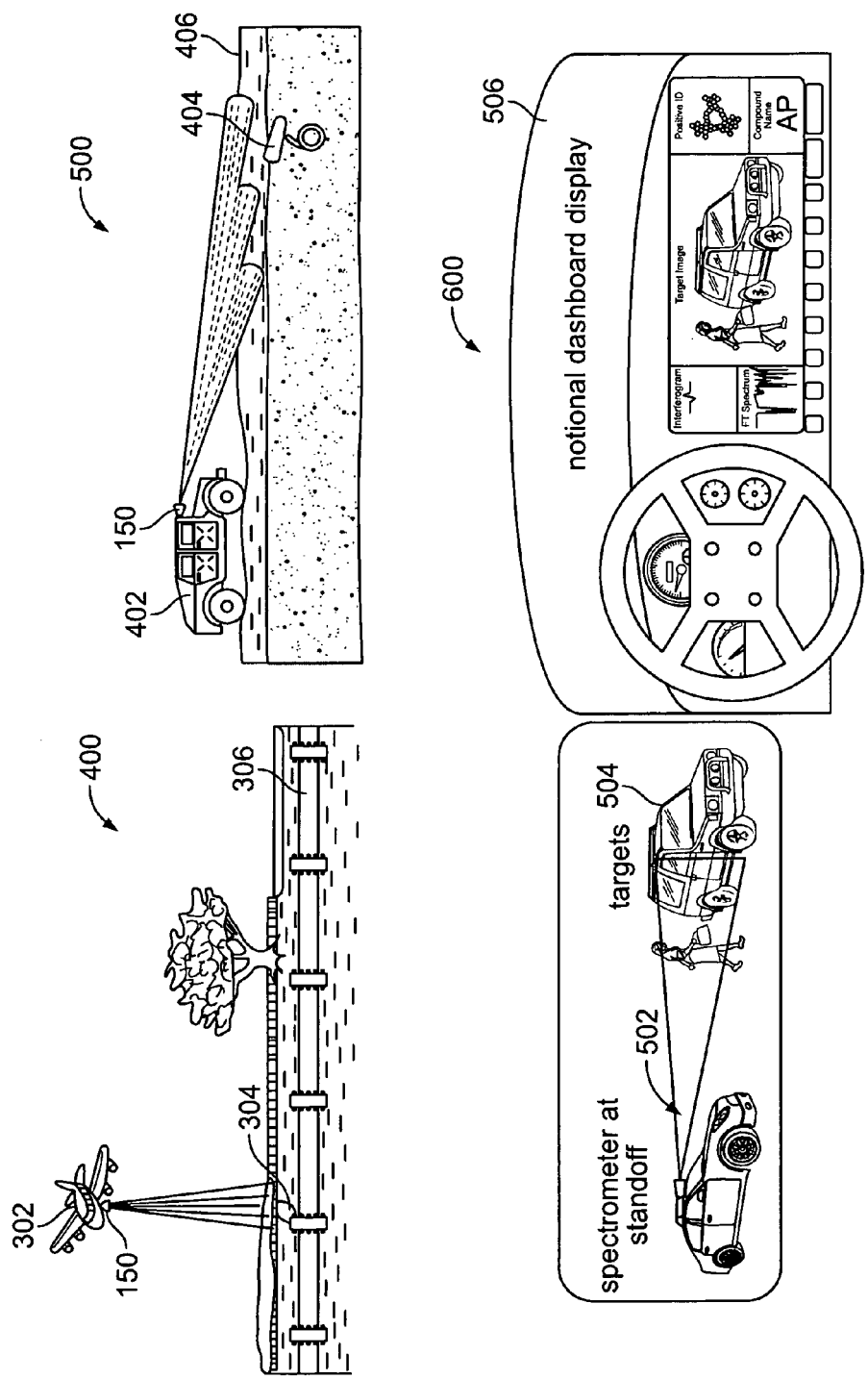
FIG. 6 is a schematic diagram showing applications of the spectrometer of FIG. 2.

Referring now to FIG. 6, there is shown a first environment 400 representing an exemplary use of the present invention. As shown, the spectrometer 200 is carried by an airborne platform 302. As shown, the spectrometer herein detects a leakage 304 in an underground pipe 306. More specifically, the transceiver 150 may transmit a scanning beam for irradiating the ground above the underground pipe and then receive radiation backscattered from liquid oil on ground, water or foliage surfaces, or aerosolized natural gas or volatile liquid oil components in the air just above the underground pipe. The spectrometer may thereafter use the return radiation to generate a spectrogram which may then be analyzed to detect the leakage 304 in the underground pipe 306.

Referring again to FIG. 6 is a second environment 500 representing another application of the spectrometer. Herein, the transceiver 150 of the spectrometer is shown as carried by an automobile platform 402. The spectrometer herein detects an Improvised Explosive Device (IED) 404 buried under a ground surface 406. More specifically, the transceiver 150 of the spectrometer is mounted on a top portion of the land roving platform 402. Further, the transceiver 150 is configured to transmit a scanning beam for irradiating the ground surface, and to receive the radiation backscattered by the ground surface. The spectrometer then preferably uses the radiation to generate a spectrogram which may then be analyzed to detect the IED 404 buried under the ground surface 406 either by direct chemical identification of explosives residues or other compounds indicative of the IED, or by indirect cuing to the presence of disturbed earth or underground materials via thermal imaging.

Referring again to FIG. 6 is a third environment 600 representing yet another application of the spectrometer. In this example, the spectrometer 200 is incorporated into a patrol car 502, providing a convenient mobile platform for interrogation of targets 504. The transceiver 150 is mounted on the car's roof and is connected by a flexible umbilical to the laser source, power supplies, and other electronics, which are located in the trunk. Power for the unit is provided by the car's battery. A screen 506 mounted on the car's dash displays explosive residue identification and location overlaid on a high resolution image of the target taken by an imaging camera co-sighted with the spectrometer optics.

As detailed herein, the present invention provides a spectrometer 200 which may be deployed in harsh and demanding environments. Further, the spectrometer 200 is insensitive to vibrations and thermal effects due to the interferometer 120, and more particularly due to the absence of any moving component in the interferometer 120. This enables the spectrometer 200 to be mounted on moving platforms, such as robotic platforms, ground vehicle platforms, and airborne platforms. Further uses and applications of the present invention may include:

1) Trace chemical (including narcotics), biological, and explosives detection for military or civilian homeland security use. Mounting options include a small robotic platform, manned or unmanned aircraft (fixed wing or rotary), vehicle roof mount (military or civilian law enforcement), stationary screening locations (border crossings, checkpoints, airport, train station, bus station, etc.), a portable "back-pack" unit, or small hand-held units for close range screening.
2) Manufacturing process and smokestack monitoring in commercial industry, including applications as a stand-off sensor for monitoring chemical reaction processes in hostile reactor environments (temperature, pressure, corrosives), first alert leak detection in and around plants with hazardous materials, 24/7 records of smokestack emissions for regulatory compliance.
30) Process/quality control monitoring for the food industry, cosmetics, pharmaceuticals, etc.
4) Water testing either for homeland security purposes (chemical/biological terrorism) or monitoring of treatment plant discharge.
5) Remote monitoring of pipeline right of ways for oil and natural gas leaks.
6) Remote monitoring (surface or underwater) of leaks from offshore drilling rigs.
7) Standoff monitoring of emissions from hostile natural features (such as volcanoes, hot springs, underwater vents).
8) Trace atmospheric analysis for climate and weather monitoring (at fixed stations or on hurricane hunter/climate testing flights).
9) Spectral/chemical analysis and underwater hyperspectral imaging for wreck salvage/archeology.
10) Laser source for diffraction limited IR spectroscopy/microscopy.
11) Chemical kinetics and biological dynamics studies.
12) THz spectroscopy for detection, imaging, and identification of concealed objects. THz is capable of penetrating a variety of amorphous substances that are opaque to visible and IR radiation, such as clothing or paper. Many chemical compounds, including explosives, are known to have characteristic absorption lines in the THz. Therefore, an imaging THz spectrometer may be able to detect explosives under clothing, or determine the identity of liquids in sealed containers or powders in sealed envelopes.
13) Space applications (with considerations made for cosmic ray damage of optical fibers, including the potential use of a solid state laser; free space beam splitter, combiner, and frequency converter; and shielded fiber for the interferometer.

In one configuration, the spectrometer 200 may have a fast acquisition of individual spectra (up to 30 kilohertz with 1.5 $cm^{-1}$ resolution at 3 micrometer) of the analyte material due to the high repetition rate of the USPL source 110. Further, the spectrometer 200 may also have a low hyper-spectral imaging interrogation time of less than approximately 5 seconds with an automobile sized target at a standoff distance of approximately 10-25 meters. Further, the interrogation time may be between approximately 30-60 seconds for the same size target at standoff distances greater than about 1 kilometer. This low interrogation time may again be attributed to the use of the USPL source 110. The spectrometer 200 may also be capable of forming high-resolution hyper-spectral images of the analyte material. Such high-resolution, hyper-spectral imaging using array detectors may be capable of detecting analyte materials in concentrations of less than about 1 microgram/centimeter$^2$. With single point detection or raster scanned imaging the same surface detection limit is expected. Single-point aerosol and water-borne detection may be capable of detecting analyte materials in concentrations of approximately 1 part per million. This allows for a rapid identification of trace quantities of analyte materials.

Further, due to the coherent nature of the laser beam generated by the laser source 110, the spectrometer 200 has a greater usable path length making the spectrometer 200 suitable for imaging over long distances. Also, the spectrometer 200 may use fast gating techniques to allow acquisition of spectrograms (or images), thereby enabling low-level signal detection in even bright sunlight. In addition, the spectrometer 200 may be easily adaptable to a flexible and easily repairable modular configuration due to use of fiber optic components in the spectrometer 200.

The foregoing description of various embodiments of the invention has been presented for purposes of illustration and description. It is not intended to be exhaustive or to limit the invention to the precise form disclosed, and modifications and variations are possible in light of the above teachings or may be acquired from practice of the invention. Thus, the embodiments were chosen and described in order to explain the principles of the invention and its practical application to enable one skilled in the art to utilize the invention in various embodiments and with various modifications contemplated.

What is claimed is:

1. A spectrometer for identifying an analyte material, the spectrometer comprising:
    an ultra-short pulse laser source configured to generate a laser beam;
    an interferometer operatively coupled to the ultra-short pulse laser source, the interferometer configured to:
        receive the laser beam,
        split the laser beam into a first laser beam and a second laser beam, the second laser beam being a variable-path second laser beam, and
        electronically scan the variable-path second laser beam over the first laser beam to generate interferogram patterns;
    a frequency converter operatively coupled to the interferometer, the frequency converter configured to: receive the interferogram patterns from the interferometer and to perform a frequency conversion of the interferogram patterns to form an output beam having one or more of a plurality of desired wavelength bands; and
    a transceiver operatively coupled to the frequency converter, wherein the transceiver is configured to: receive the output beam from the frequency converter; transmit the output beam for irradiating the analyte material; and to receive radiation from the analyte material upon irradiating by the output beam, wherein the radiation received is used to identify the analyte material.

2. The spectrometer of claim 1, wherein the interferometer comprises:
    a beam splitter configured to split the laser beam received from the ultra-short pulse laser source into the first laser beam and the second laser beam;
    a fixed transmission leg operatively coupled to the beam splitter, the fixed transmission leg configured to propagate the first laser beam;
    a variable transmission leg operatively coupled to the beam splitter, the variable-path transmission leg configured to propagate the variable-path second laser beam; and
    a combiner operatively coupled to the fixed transmission leg and the variable-path transmission leg, the combiner configured to combine the first laser beam and the variable-path second laser beam for generating the interferogram patterns, thereby electronically scanning the variable-path second laser beam over the first laser beam.

3. The spectrometer of claim 2, wherein the variable-path transmission leg includes a fiber stretcher for introducing a variable path for the purpose of generating the variable-path second laser beam.

4. The spectrometer of claim 3, wherein the fiber stretcher comprises a mandrel wrapped by a portion of the variable-path transmission leg, the mandrel having two hemispherical components adapted to be forced apart by a piezoelectric actuator for the purpose of changing the overall path length of the second laser beam.

5. The spectrometer of claim 2, wherein one or both of the fixed transmission leg and the variable transmission leg are composed of fiber.

6. The spectrometer of claim 1, wherein the plurality of desired wavelength bands includes one or more hands in the ultraviolet (200-400 nm), visible (400-750 nm), infrared (750 nm to 20+ micron), or terahertz (0.5-5 THz, 60-600 micron) regions.

7. The spectrometer of claim 1 further comprising:
    a single-point or array detector system optically coupled to the transceiver, the detector system comprising a plurality of detectors for receiving the radiation from the analyte material as well as a plurality of reference detectors; and
    a data processing system operatively coupled to the detector system, the data processing system configured to transform the radiation received from the detector system into a spectrogram and to analyze the spectrogram for identifying the analyte material.

8. The spectrometer of claim 7, wherein the detector system comprises a plurality of dichroic mirrors, filters, and focusing/shaping lenses or mirrors for receiving the radiation from the analyte material and for directing the radiation onto the plurality of detectors.

9. The spectrometer of claim 7, wherein the data processing system comprises:
    a Fourier transform module configured to Fourier transform the radiation detected by the detector system into the spectrogram;
    an archived spectral database configured to store a plurality of fingerprint patterns corresponding to a plurality of materials; and
    an analyte identification module operatively coupled to the Fourier transform module and the archived spectral database, the analyte identification module configured to compare the spectrogram with the plurality of fingerprint patterns for identifying the analyte material.

10. The spectrometer of claim 9, wherein comparison of the spectrogram with the plurality of fingerprint patterns stored in the archived spectral database is based on a comparison algorithm.

11. The spectrometer of claim 9, wherein the archived spectral database is adapted to be updated based upon the identification of she analyte material.

12. The spectrometer of claim 1, wherein the frequency converter is comprised of one or more types of photonic crystal fibers (also known as a highly nonlinear fiber (HNLF) system).

13. The spectrometer of claim 1, wherein the frequency converter is comprised of one or more nonlinear crystals, including sum/difference frequency generation crystals, optical parametric generation crystals, and/or continuum/white light generation crystals.

14. The spectrometer of claim 13, wherein one or more nonlinear crystal (s) are periodically poled (including but not limited to periodically poled lithium niobate (PPLN)).

15. The spectrometer of claim 13, wherein one or more nonlinear crystals are contained in a waveguide.

16. The spectrometer of claim 1, wherein the frequency converter is comprised of both nonlinear fiber and nonlinear crystals.

17. A method for identifying an analyte material, the method comprising:
    generating a laser beam, wherein the laser beam is an ultrafast laser beam with an ultra-short pulse laser source;
    generating interferogram patterns from the laser beam;
    performing a frequency conversion of the interferogram patterns to form an output beam having one of a plurality of desired wavelength bands;
    transmitting the output beam for irradiating the analyte material;
    receiving radiation from the analyte material upon irradiating the analyte material; and
    analyzing the radiation from the analyte material for identifying the analyte material.

18. The method of claim 17, wherein generating the interferogram patterns from the laser beam further comprises:
  splitting the ultrafast laser beam into a first laser beam and a second laser beam;
  introducing a variable path in the second laser beam to generate a variable-path second laser beam; and
  electronically scanning the variable-path second laser beam over the first laser beam.

19. The method of claim 17, wherein analyzing the radiation from the analyte material for: identifying the analyte material comprises:
  performing a Fourier transform of the radiation from the analyte material into a spectrogram; and
  comparing the spectrogram with a plurality of fingerprint patterns corresponding to a plurality of materials for identifying the analyte material.

20. The method of claim 17, wherein the plurality of desired wavelength bands includes one or more bands in the ultraviolet (200-400 nm), visible (400-750 nm), infrared (750 nm to 20+ micron), and/or terahertz (0.5-5 THz, 60-600 micron) regions.

* * * * *